United States Patent Office 3,383,351
Patented May 14, 1968

3,383,351
POLYURETHANES, REACTIVE SOLUTIONS AND METHODS AND THEIR PRODUCTION
Paul Stamberger, 552 W. University Parkway, Baltimore, Md. 21210
No Drawing. Continuation-in-part of application Ser. No. 155,467, Nov. 28, 1961. This application Aug. 12, 1964, Ser. No. 389,184
23 Claims. (Cl. 260—33.2)

ABSTRACT OF THE DISCLOSURE

A reactive, stable dispersion can be prepared by the in situ polymerization of an ethylenically unsaturated monomer in an appropriate reactive medium such as a polyol. The in situ polymerization produces a dispersed polymer containing reactive radicals. The stable dispersion can be employed in any of a number of reactions, e.g., polyurethane-forming reactions, to introduce into the resultant product, as an integral part thereof, both the polyol and dispersed polymer.

---

This invention relates to novel methods of preparing polyurethanes, to reactive solutions therefor and to products produced by such methods.

This application is a continuation-in-part of application Ser. No. 155,467, filed Nov. 28, 1961, now abandoned, and of application Ser. No. 256,531, filed Feb. 6, 1963, now U.S. Patent No. 3,304,273.

Polyurethanes constitute a broad class of polymeric materials having a wide range of physical characteristics. The polymers are produced through the interaction of a polyfunctional isocyanate with a polyfunctional chemical compound having an active hydrogen in its structure such as a polyester, polyesteramide or polyether or mixtures of two or more of such materials. This component used in preparing the polyurethane is generally termed by the art the "active-hydrogen-containing material" and is generally liquid or a solid capable of being melted at a relatively low temperature. The materials conventionally used contain hydroxyl groups as the radical having the active hydrogen and thus are generally termed "polyol." The preparation of such materials is shown, for example, in U.S. 2,888,409 and in the patents referred to therein. In addition, other hydroxyl-capped polymers useful as the polyol in preparing polyurethane resins include polyformals as described for example in U.S. 3,055,871 to Heffler et al.; the hydroxyl-terminated lactone polyesters described in U.S. 3,051,687 to Young et al.; the alkylene oxide adducts of the allyl alcohol-styrene polymers as described in U.S. 2,965,615 to Tass, et cetera. For reasons of commercial availability and cost, it is conventional to use polyethers having hydroxyl-terminated chains in the preparation of polyurethane foams and either such polyethers or hydroxyl-terminated polyesters in preparing vulcanizable gum, adhesives, films, et cetera. The polyurethane end products are generally cross-linked to some extent by including with the polyol (which is generally difunctional) a small amount of a polyfunctional cross-linking agent.

Despite the variety of physical and chemical properties obtainable by proper selection of the polyisocyanate and the polyol, as well as the conditions under which the reaction is carried out, there are definite limitations in selecting components for desirable properties in the resulting resin. One of the most significant of such limitations arises from the fact that the polyol is generally of relatively low molecular weight arising from the fact that it must be sufficiently liquid to permit mixing and reaction with the polyfunctional polyisocyanate in producing the final polyurethane resin. Further, the use of higher molecular weight components is attended by a variety of other difficulties including handling and compounding problems, the use of inert solvents and the problems attendant thereon as solvent removal, shrinkage, et cetera.

A great deal of art has grown up reflecting the extensive efforts made to incorporate higher molecular weight resinous material in polyurethane formulations. Such efforts range from mere mechanical mixtures as described, for example, in U.S. 3,049,505 to Grabowski, to such other means as the addition of a polymer latex as described in U.S. 2,993,013 to Wolfe, wherein an aqueous elastomer latex is added as one component to an isocyanate-terminated polyurethane so that the water phase of the latex reacts with the free isocyanate groups and at the same time the elastomer of the latex is incorporated into the resulting polyurethane.

Another means shown by the art is in U.S. 2,693,838 to Simon et al., wherein a small amount of the desired polymer is dissolved in a large excess of the polyfunctional isocyanate. Where the polymer is inert to the isocyanate, it is merely mechanically incorporated into the resulting polyurethane while, where a reaction occurs, the reactive radicals in the polymer itself may enter into a reaction with the polyisocyanate before it can be compounded with additional ingredients.

Still another means shown by the art is in U.S. 3,008,917 to Park et al., wherein an unsaturated liquid monomer such as styrene is added to a polyester-isocyanate adduct which itself contains vinyl unsaturation (as by utilizing a polyester prepared from maleic anhydride or similar unsaturated acid). The resulting mixture is then copolymerized through the unsaturated linkages.

Yet another method is shown in U.S. 2,882,260 to Bartl et al. In this process an isocyanate is attached to an ethylenically unsaturated compound, the isocyanate group is then blocked to render it non-reactive and the resulting compound is copolymerized as with styrene or a similar monomer in aqueous emulsion or similar process and the resulting polymeric product is dried and then heated to unblock the isocyanate groups and cause cross-linkage.

Despite the variety and ingenuity displayed by such art, polyurethanes still remain greatly limited in practical methods for the inclusion of higher molecular weight polymers therein.

Accordingly, it is a primary purpose of the present invention to present novel methods of forming polyurethanes which employ high molecular weight film-forming polymers in the polyurethane reaction.

Another object of the invention is to incorporate high molecular weight film-forming polymers as one of the reactants in forming polyurethanes whereby the film-forming polymers are chemically incorporated in the resulting polyurethane.

A further object of the invention is to incorporate high molecular weight film-forming polymers in polyurethane resins without complicated or cumbersome processing techniques.

It is another principal object of the present invention to provide a novel method of forming polyurethanes utilizing high molecular weight film-forming polymers as one of the components in the polyurethane reaction.

It is still a further object of the present invention to produce film-forming polymers having radicals reactive with the isocyanato radical in a solvent medium also having radicals reactive with said isocyanato radical.

Another object of the present invention is to provide a process for the production of polyurethanes which is carried out with liquid reactants, including a polyfunctional isocyanate and a high molecular weight film-forming polymer in a medium reactive with the isocyanato radical, which involves a minimum of handling and compounding problems, and which results in negligible shrinkage of the polyurethane reaction product.

Another object of the present invention is to provide novel and improved polyurethanes resulting from the novel processes of the instant application.

These and other objects and advantages of the present invention will become more apparent upon reference to the following detailed description and appended claims.

In essence, the invention of the instant application comprises a method for preparing reactive compositions comprising the steps of (a) Dispersing a minor amount of ethylenically unsaturated monomer in a major amount of a solvent medium, said solvent medium consisting essentially of at least one normally liquid polyol essentially free from ethylenic unsaturation and having a molecular weight of at least about 500 and a hydroxyl number in the range of about 30 to about 600, and (b) Polymerizing said monomer in said solvent by free radical addition polymerization to a substantially linear polymer having a molecular weight of at least 5,000 to provide a liquid, stable dispersion of polymer-polyol having a viscosity of less than 40,000 cps. at 10% polymer concentration.

The reactive compositions of the present invention have two essential components: a high molecular weight film-forming polymer having radicals reactive with isocyanato radicals and a reactive solvent which is a solvent or dispersing medium for said polymer and which contains radicals reactive with isocyanato radicals. This will be more fully explained hereinafter. Upon addition of the polyisocyanate to the reactive compositions of the invention, the film-forming polymer and the reactive solvent both enter into a chemical reaction with the isocyanato groups and are chemically and integrally bound in the resulting polyurethane.

In accordance with the present invention, the reactive radical-containing polymers are formed in situ in the reactive solvent by adding monomers or low molecular weight oligomers to the solvent and effecting polymerization therein. Such polymers can be formed from ethylenically unsaturated monomers containing at least one polymerizable >C=C< group. The reactive solvent must, of course, be compatible in each instance with the system involved. It is only necessary that the film-forming polymer so produced be reactive with isocyanato groups and form a stable solution or dispersion in the reactive solvent.

The preferred reactive radical (i.e. reactive with the isocyanato group) is an active hydrogen [the term "active hydrogen" refers to hydrogen atoms, which, because of their position in the molecule display activity according to the Zerewitinoff test as described by Wohler in the Journal of the American Chemical Society, vol. 49, page 3181 (1927)]. Illustrative of some of the reactive radicals containing active hydrogen are —COOH, —OH, —NH$_2$, =NH, —CONH$_2$, substituted ammonias such as quaternary ammonium, mercapto compounds, et cetera.

Compounds containing the ≡N group, such as N-vinyl pyrrolidone, methacrylonitrile, dimethylaminomethyl methacrylate and vinyl pyridine, do not give a positive Zerewitinoff test but they do polymerize in reactive solvents to produce reactive compositions containing the film-forming polymers in the reactive solvent, said compositions containing film-forming polymer having a minor amount of reactive radicals introduced into the polymer during the polymerization reaction from the polymerization medium. This probably occurs by chain transfer with graft or block formation. These reactive compositions are useful in the production of polyurethanes having outstanding properties.

As previously indicated, the reactive compositions of this invention are produced by the in situ polymerization of a polymerizable ethylenically unsaturated monomer in a reactive solvent medium. During this polymerization a minor amount of graft or block polymer is inherently produced. Thus, regardless of whether or not the ethylenically unsaturated monomer itself contains radicals reactive with the isocyanato group, the reactive compositions produced always contain film-forming polymer having radicals reactive with the isocyanato group. Among ethylenically unsautrated monomers which do not have a radical reactive with the isocyanato group are styrene, methyl methacrylate and vinyl acetate; however, all of these produce, after polymerization, reactive compositions that contain film-forming polymer having a minor amount of reactive radicals introduced from the polymerization medium and the reactive compositions react with the isocyanato group.

The reactive compositons are produced by polymerizing the monomers in the selected reactive solvent at a temperature of from about 40° C. to 150° C. in the presence of a catalytically effective amount of a conventional free radical catalyst known to be suitable for the polymerization of ethylenically unsaturated monomers. The concentration of the catalyst can vary from about 0.001 to about 5 percent, preferably from about 0.2 to about 0.5 percent; however, any effective catalytic amount is satisfactory. Illustrative catalysts are the well-known free radical type of vinyl polymerization catalysts, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-alpha-cumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis(p-methoxybenzoyl)peroxide, p-monomethoxybenzoyl peroxide, rubrene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-Decalin hydroperoxide, alpha-methylbenzyl hydroperoxide, alpha-methyl-alpha-ethyl benzyl hydroperoxide, Tetralin hydroperoxide, triphenylmethyl hydroperoxide, diphenylmethyl hydroperoxide, alpha,alpha'-azo-2-methyl butyronitrile, alpha,alpha'-2-methyl heptonitrile, 1,1'-azo-1-cyclohexane carbonitrile, dimethyl alpha,alpha'-azo-isobutyrate, 4,4'-azo-4-cyanopentanoic acid, azobisisobutyronitrile, persuccinic acid, diisopropyl peroxy dicarbonate, and the like; a mixture of catalysts may also be used.

The polymerization can also be carried out with an inert organic solvent present. Illustrative thereof are toluene, benzene, acetonitrile, ethyl acetate, hexane, heptane, dicyclohexane, dioxane, acetone, N,N-dimethylformamide, N,N-dimethylacetamide, and the like, including those known in the art as being suitable solvents for the polymerization of vinyl monomers. The only requirement in the selection of the inert solvent and the reactive solvent is that they do not interfere with the monomer's polymerization reaction. When an inert organic solvent is used, it is preferably removed by conventional means.

The monomers useful in the process of this invention are the polymerizable monomers characterized by the presence therein of at least one polymerizable ethylenic unsaturated group of the type C=C. The monomers can be used singly or in combination to produce homopolymer/reactive solvent or copolymer/reactive solvent reactive compositions.

These monomers are well known in the art and include the hydrocarbon monomers such as butadiene, isoprene, 1,4-pentadiene, 1,6-hexadiene, 1,7-octadiene, styrene, alpha-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxystyrene, methyl 4-vinylbenzoate, phenoxystyrene, p-vinyl diphenyl sulfide, p-vinylphenyl phenyl oxide, and the like; the acrylic and substituted acrylic monomers such as acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl alpha-chloroacrylate, ethyl alpha-ethoxyacrylate, methyl alpha-acetaminoacrylate, butyl acrylate, 2-ethylhexyl acrylate, phenyl acrylate, phenyl methacrylate, alpha-chloroacrylonitrile, N,N - dimethylacrylamide, N,N - dibenzylacrylamide, N-butylacrylamide, methacrylyl formamide, and the like; the vinyl esters, vinyl ethers, vinyl ketones, etc. such as vinyl acetate, vinyl chloroacetate, vinyl alcohol, vinyl butyrate, isopropenyl acetate, vinyl formate, vinyl acrylate, vinyl methacrylate, vinyl methoxy acetate, vinyl benzoate, vinyl iodide, vinyl toluene, vinyl naphthalene, vinyl bromide, vinyl fluoride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl methyl sulfone, N-methyl-N-vinyl acetamide, N-vinylpyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention. Any of the known chain transfer agents can be present if desired.

When the polymerization is carried out in the polyol, and the like reactive radical-containing medium, it has been found that interaction occurs to some degree between the solvent and the polymer chain being formed whereby a graft or block copolymer is inherently produced wherein the solvent molecule provides reactive radicals to the block or graft copolymer. It is known in the art that free radical producing inhibitors or catalysts are used for carrying out the polymerization reaction. These produce active sites initiating the formation of block or graft polymers which are probably formed by chain transfer mechanisms in vinyl addition polymerization. In this manner polymers inherently containing reactive groups are prepared from ethylenically unsaturated monomers which contain no reactive groups, provided that the polymers are prepared by polymerization in a solvent containing reactive groups, such as active hydrogen. The reactive solvent used in the polymerization can also act as a chain transfer agent and enter into the polymer chain. By the method of this invention, therefore, reactive radicals can be introduced into polymer chains by proper selection of the reactive solvent used as the medium for the polymerization. These polymers can then be used for the production of polyurethanes with outstanding properties.

The distribution of reactive radicals in the film-forming polymers is, of course, not limited to terminal positions. On the contrary, such radicals may be at various positions throughout the entire polymer chain. It is generally advantageous, however, to use as one of the monomers a material which itself contains a reactive hydrogen group, thus allowing a much wider range of frequency of reactive radicals.

The type of nitrogen bond formed in the reaction of the polyisocyanate and the film-forming polymer will vary depending on the chemical nature of the reactive composition. The chemistry of formation and significance of the type of bonding are known in the art.

If the polymer contains certain types of nitrogen radicals, such as amino or amido radicals, it will also act as a catalyst for the polyurethane formation. Where the reactive radical is carboxyl, it may be desirable to modify the structure of the film-forming polymer for certain purposes. More specifically, it is well known that the reaction product of the —COOH and —N=C=O radicals is an amide plus $CO_2$. This reaction is desirable for foam production but is frequently undesirable when porosity in the finished product is to be avoided. It is a feature of the present invention to avoid porous production formations in such a situation by reacting a salt-forming nitrogen derivative with the carboxyls of the film-forming polymer so as to change the reaction mechanism of the components. (See, for example, applicant's co-pending application Ser. No. 117,488, filed May 12, 1961.) For example, a primary or secondary amine may be introduced, which will result in the formation of a urea linkage with the —N=C=O radical. Similarly, amino alcohols may be introduced, in which case the hydroxyl group will react with the —N=C=O to form urethane linkages. In these cases, a non-porous film or mass can be obtained with the substituted —COOH radical. The —COOH radical can also be reacted with a polyamine containing at least two free primary amino groups. The available primary amino groups may then be reacted with phosgene to form isocyanato groups so that the material thus obtained would be an isocyanato-containing prepolymer.

The combining weight of the polymer (with respect to the polyisocyanate with which it is to be reacted) will play a significant part in the properties of the polyurethane reaction product since the frequency of the reactive radicals will determine the location and also the number of bonds formed in the reaction between the polymers and the polyisocyanate. More specifically, in order to obtain the most highly useful product following the isocyanate reaction, the reactive film-forming polymer should contain a minimum number of reactive radicals such that the combining weight of the polymer is not too high, viz., preferably below 4000. Although in certain cases higher combining weights also give good products, generally speaking, the higher the combining weight, the softer, more elastic the reaction product; the lower the combining weight, the more rigid the reaction product will be, using the same major components in the product.

The optimum combining weight for a given reactive polymer (to produce an end product having the most desirable properties) may be determined by simple experimentation. The combining weight of a given polymer reflects both the particular monomers used in the formation of the polymer as well as the mol ratios of such monomers. Since at least some of the groups of the polymer or copolymer which are reactive with the isocyanato group are those present in the molecule of the reactive solvent in the polymer, the number of bonds formed in the reaction between the polymer and the polyisocyanate cannot be easily predicted in advance. However, the optimum concentration for any particular property can be determined by normal routine experimentation.

The film-forming polymers are present as dispersions or solutions in a reactive solvent and the reactive solutions or dispersions formed from said polymers are often dilutable with a reactive solvent. Where the solution or dispersion is not dilutable, the polymer should be prepared in the solvent at the concentration desired for the ultimate use so that dilution is unnecessary.

The molecular weight of the film-forming polymers of the present invention will necessarily vary within reasonably wide limits depending upon the particular polymer formed. The molecular weight is only a rough indication of whether a polymer is a film-former. The film-forming ability of a polymer is determined primarily by its cohesive energy. Conventionally a polymer is considered to be a film-forming polymer when the cohesion in the polymer itself is great enough to produce a film above the "glass" temperature, i.e., above the second order transition temperature. In general, the film-forming polymers used have a molecular weight above 5000, best properties being obtained with film-forming polymers having molecular weights of 10,000 or greater. The upper molecular weight limit is one selected for practical considerations; the reactive compositions are preferably those which are free flowing at the temperature at which reaction with the polyisocyanate is carried out, i.e., the composition should have a viscosity at that temperaure of less than about 40,000 cps. If the reactive polymer has sufficient reactive radicals to cross-link adequately with the isocyanate, the restriction that the polymer be film-forming may be somewhat relaxed.

As is evident from the list of monomers which may be used to form the film-forming polymers of the present invention, film-forming polymers having either aromatic or aliphatic nucleii (or both) may be employed. The choice of the particular nucleus is dependent upon the final properties desired in the polyurethane. For example, film-forming polymers having predominantly aromatic nucleii will tend to produce stiffer products; those with predominantly aliphatic nucleii will tend to produce softer products. In general, the physical properties of the polymer will reflect in the polyurethanes.

The second essential component of the reactive composition of the present invention is a reactive solvent. The "reactive solvent" used herein is the "active-hydrogen-containing material" known in the art and conventionally used in preparing polyurethane resins.

The reactive solvent must be selected to meet several diverse requirements:

(1) It must act as a solvent or dispersing medium for the film-forming polymer.

(2) It must not be so reactive with the film-forming polymer as to reduce substantially the reactive radical content of either the solvent or the polymer or to form a gel or a hard infusible resin which would interfere or even prevent the reaction with the polyisocyanate.

(3) It should form stable solutions or dispersions with the film-forming polymer which are preferably dilutable without the formation of undesirable precipitates with the components used to form the polyurethane polymer.

(4) It must be a liquid, at least at the temperaures used for the reaction with the polyisocyanate.

(5) It must have at least two radicals which are reactive with the —N=C=O of the polyisocyanates so as to form a polymeric reaction product with the polyisocyanate.

The preferred reactive solvents are the polyols having properties described above. The polyols suitable for production of the reactive compositions can be a hydroxyl-terminated polyester, a polyhydroxyalkane, a polyphenol, a polyoxyalkylene polyol, or the like, having a molecular weight of about 500 and the corresponding mercapto derivatives. Among the polyols which can be employed are one or more polyols from the following classes of compositions; minor amounts of polyhydroxyalkanes can be present:

(a) Hydroxyl-terminated polyesters;
(b) Alkylene oxide of polyhydroxyalkanes;
(c) Trialkanolamines and alkylene oxide adducts thereof;
(d) Alcohols derived from mono- and polyamines by addition of alkylene oxides;
(e) Non-reducing sugars and sugar derivatives and alkylene oxide adducts thereof;
(f) Alkylene oxide adducts of aromatic amine/phenol/aldehyde condensation products;
(g) Alkylene oxide adducts of phosphorus and polyphosphorus acids;
(h) Polyphenols and alkylene oxide adducts thereof;
(i) Polytetramethylene glycols, and the like.

Illustrative hydroxyl-terminated polyesters are those which are prepared by polymerizing a lactone in the presence of an active hydrogen-containing starter as disclosed in U.S. Patent No. 2,914,556.

Illustrative alkylene oxide adducts of polyhydroxyalkanes include, among others, those adducts of ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, xylitol, arabitol, sorbitol, mannitol, and the like, having a molecular weight of at least 500; preferably the adducts of ethylene oxide, propylene oxide, epoxybutane, or mixtures thereof.

Two particularly preferred classes of alkylene oxide adducts of polyhydroxyalkanes are the ethylene oxide, propylene oxide, butylene oxide, or mixtures thereof, adducts of dihydroxyalkanes and of trihydroxyalkanes.

The preferred class of alkylene oxide adducts of dihydroxyalkanes contemplated are the polyoxyalkylene glycols, such as the alkylene oxide adducts of diethylene glycol, triethylene glycol, tetraethylene glycol, dipropylene glycol, tripropylene glycol, tetrapropylene glycol, dibutylene glycol, as well as the high molecular weight polyoxyethylene glycols, high molecular weight polyoxypropylene glycols, mixed ethyene-propylene glycols, mixed polyoxyethylene-polyoxypropylene glycols, and the like.

Further examples of suitable polyesters and polyethers for use as the polyol of the present invention are described in U.S. Patents 2,814,606; 2,801,990; 2,801,648; 2,777,831; 2,606,162 and 2,432,148. The patents also teach the method of preparing such polyols.

Another useful class of polyols which can be employed are the trialkanolamines which, by reaction with alkalene oxides, form adducts of suitable molecular weight, and the alkylene oxide adducts thereof. Illustrative of the lower molecular weight trialkanolamines includes triethanolamine, triisopropanolamine, and tributanolamine. The alkylene oxide adducts which can be employed are preferably those wherein the oxyalkylene moieties thereof have from 2 to 4 carbon atoms.

Another useful class of polyols which can be employed are the alkylene oxide adducts of mono- and polyamines.

The mono- and polyamines are preferably reacted with alkylene oxides which have 2 to 4 carbon atoms, for example, ethylene oxide, 1,2-epoxypropane, the epoxybutanes, and mixtures thereof. Mono- and polyamines suitble for reaction with alkylene oxides include, among others, methylamine, ethylamine, isopropylamine, butylamine, benzylamine, aniline, the toluidines, naphthylamines, ethylenediamine, diethylenetriamine, triethylenetetramine, 1,3-butanediamine, 1,3-propanediamine, 1,4-butanediamine, 1,2-, 1,3-, 1,4-, 1,5-, and 1,6-hexanediamine, phenylenediamines, toluenediamine, naphthalenediamines, and the like. Among the compounds of the above groups which are of particular interest are, among others, N,N,N',N'-tetrakis(2-hydroxyethyl)ethylenediamine, N,N,N',N'-tetrakis(2-hydroxypropyl)ethylenediamine, N,N,N',N",N"-pentakis(2-hydroxypropyl)diethylenetriamine, phenyldiisopropanolamine and higher alkylene oxide adducts of aniline, and the like. Others which deserve particular mention are the alkylene oxide adducts of aniline or substituted aniline/formaldehyde condensation products.

A further class of polyols which can be employed are the non-reducing sugars, the non-reducing sugar derivatives, and more preferably, the alkylene oxide adducts thereof wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like.

A still further useful class of alcohols are the polyphenols, and preferably the alkylene oxide adducts thereof wherein the alkylene oxides have from 2 to 4 carbon atoms. Among the polyphenols which are contemplated are found, for example, bisphenol A, bisphenol F, condensation products of phenol and formaldehyde, more particularly the novolac resins, condensation products of various phenolic compounds and acrolein, the simplest members of this class being the 1,1,3-tris(hydroxyphenyl)propanes, condensation products of various phenolic compounds and glyoxal, glutaraldehyde, and other dialdehydes, the simplest members of this class being the 1,1,2,2-tetrakis(hydroxyphenyl)ethanes, and the like.

Another desirable class of polyols are the alkylene oxide adducts, preferably the ethylene oxide, 1,2-epoxypropane, epoxybutane, and mixtures thereof, adducts of aromatic amine/phenol/aldehyde condensation products. The condensation products are prepared by condensing an aromatic amine, for instance aniline, toluidine, or the like, a phenol such as phenol, cresol, or the like, and an aldehyde, preferably formaldehyde, at elevated temperatures in the range of, for example, from 60° C. to 180° C. The condensation product is then recovered and reacted with alkylene oxide, using a basic catalyst (e.g., potassium hydroxide) if desired, to produce the polyols. The propylene oxide and mixed propylene-ethylene oxide adducts of aniline/phenol/formaldehyde condensation products deserve particular mention.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorous acid, the polyphosphoric acids such ast tripolyphosphoric acid, the polymetaphosphoric acids, and the like are desirable for use in this connection.

Another useful class of polyols are the polytetramethylene glycols, which are prepared by polymerizing tetrahydrofuran in the presence of an acidic catalyst.

The polyols employed can have hydroxyl numbers which vary over a wide range. In general, the hydroxyl numbers of the polyols employed in the invention can range from about 20, and lower, to about 1000, and higher, preferably, from about 30 to about 600, and more preferably, from about 35 to about 450. The hydroxyl number is defined as the number of milligrams of potassium hydroxide required for the complete hydrolysis of the fully acetylated derivative prepared from 1 gram of polyol. The hydroxyl number can also be defined by the equation:

$$OH = \frac{56.1 \times 1000 \times f}{M.W.}$$

where

OH = hydroxyl number of the polyol
$f$ = functionality, that is, average number of hydroxyl groups per molecule of polyol
M.W. = molecular weight of the polyol.

The exact polyol employed depends upon the end use of the polyurethane product to be produced. For example, in the case of foamed reaction products, the molecular weight of the hydroxyl number is selected properly to result in flexible, semiflexible, or rigid foams. The above polyols preferably possess a hydroxy number of from about 200 to about 1000 when employed in rigid foam formulations, from about 50 to about 150 for semiflexible foams, and from about 40 to about 70 or more when employed in flexible foam formulations. Such limits are not intended to be restrictive, but are merely illustrative of the large number of possible combinations of the above polyol coreactants.

The reactive composition (comprising the film-forming polymer in the reactive solvent) contains from 5 to 50 percent by weight of the polymer therein; a preferable concentration is about 20 to 50 percent by weight. Solutions having in excess of 50 percent by weight of the film-forming polymer are ordinarily too viscous for practical purposes.

The isocyanates used to form the polyurethanes of the present invention must be polyfunctional. Examples of such polyisocyanates are the tolylene diisocyanates, hexamethylene diisocyanates, diphenylmethane diisocyanates, naphthalene diisocyanates, triphenylmethane triisocyanates, phenylene diisocyanates, bitalylene diisocyanates, dianisidine diisocyanate, dimethyldiphenylmethane diisocyanates, triisocyanatodiphenyl ethers, et cetera, such as meta-toluene diisocyanate, 4,4'-diphenyl diisocyanate, 4,4'-diphenylene methane diisocyanate, 1,5-naphthalene diisocyanate, 4,4'-diphenyl ether diisocyanate, p-phenylene diisocyanate, ethylene diisocyanate, trimethylene diisocyaante, cyclohexylene diisocyanate, 2-chloropropane diisocyanate, tetrachlorophenylene diisocyanate-1,4, durylene diisocyanate, xylylene diisocyanates, 3,10-diisocyanatotricyclo[5.2.1.0$^{2,6}$]decane, et cetera. A more complete list of polyisocyanates is set forth by Siefken in Annalen, 562, pp. 122–135 (1949).

The polyisocyanates react both with the film-forming polymer and the reactive solvent so that the polyurethanes formed using the reactive solutions of the instant invention incorporate both of these materials into the chemical structure of the polyurethane. Thus the resulting polyurethanes constitute a novel group of polymers having substantially different properties than could be obtained by a mere mechanical mixture. The new film-forming polymers have significantly different properties from the polymer formed by the same monomer or monomers polymerized under conditions such that the reactive solvent molecules are not incorporated into the polymer chain. In the polyurethane formation, the new reactive composition containing the film-forming polymer has significantly different properties compared with other systems in which the preformed polymers have been dispersed in a reactive solvent. The reaction rate for polyurethane formation is similar for the radicals of solvent molecules attached to the polymer and for the solvent itself. A more uniform polyurethane is thus formed. The polyurethanes produced using such reactive solutions contain bonds formed by the reaction of the polyisocyanate and the separate reactive groups of the film-forming polymer and the reactive solvent, and direct chemical bonds between the polymer and the solvent. Thus, such polyurethanes comprise a variety of chemical bonds with consequent effect on the physical and chemical properties of the polyurethanes.

The reactive compositions produced are stable dispersions. However, in the majority of cases, stable dispersions could not be obtained when preformed polymer produced from the same monomer by conventional processes was mixed with the same reactive solvent.

The reactive compositions of the present invention may be used in place of the polyols of the prior art in any of the processes used in preparing polyurethanes. Thus, the compositions may be used in the prepolymer process, the quasi-prepolymer process or the one-shot process. The polyurethanes may be further reacted with epoxy resins, cured with sulfur, peroxides or other curing agents, or otherwise reacted or modified as known to those skilled in the art. In using the one-shot process, as described for example in United States 2,866,774 to Price, it is desirable to use a silicone oil emulsifier as described in United States 2,834,748 and 2,917,480.

To form the polyurethanes of the present invention, an excess of the polyisocyanate is generally employed. In general, the ratio between the —N=C=O radicals and the other reactive radicals in the reactant mass (including those in the film-forming polymer, the polyol and the other non-isocyanate reactants, if any) is from about 1:1 to 5:1 and, in exceptional cases, up to 6:1.

As aforestated, the viscosity of the reactive composition (comprising the film-forming polymer and the polyol in the ratio desired) generally should be less than about 40,000 cps. under conditions of use. Generally speaking, the viscosity of the reactive composition should be such that the solution is dilutable upon simple mixing with additional quantities of polyfunctional liquid reactants used. The viscosity of the reactive composition should also be low enough to permit easy mixing of the isocyanates with the reactive solution. The term "composition" as used herein in the specification and claims includes both optically clear or turbid solutions or dispersions of solvated film-forming polymer in which there is a marked viscosity increase or wherein the polymer does not separate from solution on storage or during conventional handling.

In carrying out the process of the present invention, the reactive composition is first prepared and then mixed with the polyisocyanate and any other reactants desired. For example, it may be desired to vary the quantity of reactive, non-isocyanate radicals in the reactant mass by adding other active hydrogen-containing compounds.

Because of the great many variables involved in the process of the present invention, i.e., the desired properties of the finished product, the combining weight of the reactants, the type of bonding, the solubility requirements (including the possibility that certain materials will cause an undesirable precipitate to form in the reactive solution), the selection of particular film-forming polymers, solvents and other additives to be employed in the reaction must, in good part, be done on an experimental basis. The complete flexibility of the instant process, however, makes possible the easy adjustment of the reactant mass to conform it to one having desired characteristics.

This invention is further illustrated by the following examples without, however, being restricted thereto. All parts are by weight, unless otherwise specified. Unless otherwise stated in the examples, the polymerization reactions were carried out in a three-necked flask equipped with an agitator, a reflux condenser, a thermometer, the three-necked flask being connected to a nitrogen cylinder. Prior to the addition of the catalyst, the contents of the flask were purged with nitrogen for 30 minutes and heated. After completion of the reaction, toluol was added and the traces of water remaining in the flask were removed by azeotropic distillation. The reaction was carried out to an unreacted monomer content of 5 percent maximum.

Example 1

The flask was charged with 220 g. styrene of 99% purity inhibited with 0.02% of 5-butylcatechol, 125 g. 2-ethylhexyl acrylate of 99% purity inhibited with 0.05% hydroquinone and 400 g. of Pluracol P2010 (a polyproylene ether diol terminated with two hydroxyl radicals, having a molecular weight of 2000 and combining weight of 1000 and made by the Wyandotte Chemical Co.). After raising the temperature of the flask to 70° C., 1½ g. of azobisisobutyronitrile catalyst were added. The polymerization reaction was then carried out at 130° C. for 3 hours.

The result of the reaction was a viscous solution having 1.3% unreacted styrene and 2½% of ethylhexyl acrylate. The combining weight of the solution was 1800. The solution could not be diluted with other polyols but could be diluted with aromatic and chlorinated hydrocarbons.

Example 2

The product of Example 1 was used to form a cellular polyurethane product with tolylene diisocyanate having a composition of 80% 2,4- and 20% 2,6-substitution and having an equivalent weight of 87. The conventional ratio between the —N=C=O radicals and the other reactive radicals (such as hydroxyl and carboxyl) was adjusted to 2.8. Hereafter NCO/X will be used to express this ratio, X being the sum of the equivalents of all the non-cyanato reactive radicals. The amount of water was calculated to give a low density foam.

The product of Example 1 could only be used without dilution; otherwise solidification took place. To 50 grams of the compound of Example 1, ½ gram of a surface-active silicone oil was added as a foam stabilizer and to this mixture 1 gram water and ½ gram N-ethyl morpholine was added, the latter serving as a catalyst. Seven grams of the diisocyanate were then added to this mixture, resulting in the formation of a very viscous material whose volume expanded only slightly and which slowly set to a solid. After 24 hours at 70° C., with the formula used, the material had little strength and appeared to be inferior to other products obtained according to the present invention. This may be due to the insufficiency of the quantity of catalyst used.

Example 3

The process of Example 1 was repeated using 55 gm. styrene, 31 gm. 2-ethylhexyl acrylate and 300 gm. Pluracol P2010. The polymer content of the solution was 22%, which is about half the polymer content of the solution in Example 1. The reactive solution of Example 3 was dilutable with further additions of Pluracol P2010 without solidification or other adverse effect.

Example 4

To 100 gm. of the reactive solution of Example 3 are added 0.25 gm. tin octoate, 2.0 gm. surface active silicone oil, 0.2 gm. N-methyl morpholine, 0.1 gm. N,N,N',N'-tetramethyl butanediamine, 3.5 gm. water and 35 gm. tolylene diisocyanate. An excellent polyurethane foam was obtained having a density of 2.4 lbs./c. ft. and a compression set (ASTM) of 40%.

Example 5

The flask was charged with 220 gm. styrene, 125 gm. 2-ethylhexyl acrylate, 32 gm. glacial acrylic acid and 500 gm. of Pluracol P2010 (the polypropylene ether diol used in Example 1). The polymerization was carried out under the same conditions used in Example 1, again utilizing 1½ gm. of azobisisobutyronitrile as a catalyst.

The resulting polymer solution had 1.3% unreacted styrene, 2% ethylhexyl acrylate and 0.7% acrylic acid. The combining weight for the carboxyl radical was determined by titration of the alcoholic solution with 2 N KOH. The figure determined for the solution was 2950 which, if calculated for the polymer content, was 1200. The combining weight for all the reactive radicals in the solution (carboxyls and hydroxyls) was 1060. The polymer content of the solution was 41%. This solution could be diluted without difficulty with polyhydric alcohols and was compatible with the polyisocyanates.

Example 6

25 grams of the reaction product of Example 5 and 25 grams of a polyoxypropylene triol derived from trimethylol propane and having a molecular weight of 2600, a hydroxyl number of 63 (mg. KOH/gm.), a viscosity of 440 cps. at 25° and a combining weight of 890, were mixed together. A uniform solution with a viscosity of 11,000 cps. was obtained.

As in Example 2, ½ gram silicon oil, 1.2 grams water and 0.5 gram N-ethyl morpholine were mixed into the liquid and 12½ grams of diisocyanate added. The mixture was poured into a mold of 880 ml. capacity which was filled in 6 minutes with the foam generated by the chemical reaction. The reaction product solidified in 20 minutes. After a 24-hour cure at 70° C., the product showed little shrinkage, uniform small cells and low tensile strength.

Example 7

The reaction was carried out under the conditions and procedure of Example 1, the charge of the flask being:

|  | Gm. |
|---|---|
| Styrene | 220 |
| Ethylhexyl acrylate | 125 |
| Glacial acrylic acid | 128 |
| Pluracol P2010 (the polypropylene ether diol of Example 1) | 600 |
| Azobisisobutyronitrile | 3 |

Unreacted monomers were: styrene, 1%; ethylhexyl acrylate, 2.1%; acrylic acid, 1%. The carboxyl equivalent weight for the solution was 790 and for the polymer itself 325. The combining weight of the solution (for the isocyanato radical) was 520. The viscous solution was compatible with polyols, polyethers and other reactive additives known to be useful for making polyurethanes.

Example 8

25 grams of the reaction product of Example 7, 25 grams of the triol in Example 6 and ½ gram of the silicone oil were mixed together. The solution obtained had a viscosity of 15,000 cps. 1.8 grams water and .5 gram N-ethyl morpholine were mixed with this solution, after which 18½ grams of the diisocyanate were added. A foam slowly formed in a mold of 1200 ml. capacity which was finally filled to the top by the foam. The foam solidified to a resistant solid in 25 minutes. After 24-hour curing at 70° C., an excellent cellular material with very high load-bearing capacity, excellent texture and good strength was obtained. This material was far superior to the control in the next example.

Example 9

Conventional polyols were used in this experiment while maintaining the NCO/X ratio at 2.8 and using the same water and isocyanate ratio as before. 25 grams of Pluracol P2010, 25 grams of the triol previously used and ½ gram of silicone oil were mixed together. A solution of low viscosity of 480 cps. was obtained to which 1.45 grams water and ½ gram of N-ethyl morpholine were added and, subsequently, 13.5 grams of the diisocyanate. The liquid mixture was poured into a mold of 800 ml. capacity. On foaming, a considerable part of the $CO_2$ gas escaped and only half of the 800 ml. capacity of the mold was filled with the foam. To obtain a somewhat resilient product, the foam had to be cured for one week at 70° C. The product had a very coarse cell structure.

Example 10

A copolymer was prepared using methyl methacrylate as one of the reactive monomers, as follows:

|  | Gm. |
|---|---|
| Methyl methacrylate | 300 |
| 2-ethylhexyl acrylate | 100 |
| Acrylic acid | 60 |
| Pluracol P2010 | 500 |

As a catalyst, 2 gm. azobisisobutyronitrile and 1 gm. benzoyl peroxide were used. A viscous solution resulted, which could be used in the same manner as the products in Examples 5 and 7. This solution had a combining weight of 1200 and gave a foam of better quality than the styrene terpolymer in Example 5.

In this example, all the ingredients used in the polymerization were of an aliphatic nature.

Example 11

A copolymer was prepared using a hydroxy comonomer. Such a polymer is reactive with the isocyanate radical, forming urethane linkages. Such a reaction does not produce a gas and the reaction product with the isocyanate is suitable for making continuous films or nonporous castings.

For carrying out the polymerization, the reaction flask was charged with:

|  | Gm. |
|---|---|
| Styrene | 220 |
| 2-ethylhexyl acrylate (whose molecular and combining weight was 130; 97.6% purity) | 124.5 |
| Hydroxyethyl methacrylate | 64 |
| Pluracol TP440 (a triol of a molecular weight of 400 and combining weight of 133) | 400 |

The reaction product was a viscous solution with a combining weight for the hydroxyl of 230.

Example 12

The same formula was used as in Example 11 except that Pluracol P2010 was used in lieu of Pluracol TP440. Again, a viscous solution was obtained, with a combining weight of 880.

Example 13

The following ingredients were mixed for the polymerization reaction:

|  | Gm. |
|---|---|
| Methyl methacrylate | 300 |
| 2-ethylhexyl acrylate | 100 |
| Hydroxyethyl methacrylate | 25 |
| Pluracol P1010[1] | 500 |
| Azobisisobutyronitrite | 3 |

[1] A diol with a molecular weight of 950, a combining weight of 475, a viscosity of 75 cps., and corresponding to the formula of the other polypropylene glycols.

The end product was a very viscous solution with a combining weight for the OH radical of 725 and having 2% unreacted acrylic esters.

While the solution was very viscous, it could be diluted with such polyols as those conventionally used for polyurethane reactions.

Example 14

To make a cellular compound, the product of Example 12 was reacted with an isocyanate while using a tin octoate catalyst which was primarily active in catalyzing the reaction between the isocyanate and hydroxyl. The NCO/OH ratio was 4.

25 grams of the solution from Example 12 was mixed with 25 grams of a triol with a molecular weight of 4000 (Pluracol TP4040 of the Wyandotte Chemical Company). A solution with a viscosity of 15,000 cps. was obtained which could be easily processed. 0.5 gram silicon oil emulsifier (polysiloxane-polyoxyalkylene block copolymer having an average molecular weight of about 7000) was mixed in to improve the foam stability. 15.5 grams tolylene diisocyanate (sold as Hylene TM by E. I. du Pont de Nemours & Co., Inc., and which is a mixed isomer consisting of 80% 2,4- and 20% 2,6-substituted product) was added thereafter. This addition reduced the viscosity of the material to 3000 cps. and allowed easy mixing with the rest of the compounding ingredients needed for the formation of the cellular product, as follows:

|  | Gm. |
|---|---|
| Tin octoate | 0.2 |
| Water | 1.4 |
| N-ethyl morpholine | 0.5 |

A foam was produced which, after being cured for 30 minutes at 80° C., was fully solidified and could be removed from the mold. The density was 2 lbs. per cubic foot, cells small and uniform (about 0.5 mm. diameter), compression deflection (RMA) at 25% compression after 5 days' aging was 36 lbs. The latter figure was much higher than that of a foam made by substituting for the polymer solution in the above formula a diol (Pluracol P2020 of the Wyandotte Chemical Company) which had a similar density and only 15 lbs. RMA compression deflection at 25% compression.

Example 15

The film properties of the reaction product of Example 12 were studied as follows: 25 grams of the polymer solution of Example 12 and 25 grams of Pluracol TP4040 were compounded with 4.5 grams tolylene diisocyanate (used as before), which combination gave an NCO/OH ratio of 1.1. This solution remained liquid for 24 hours, after which it began to gel. A film was cast and allowed to set at 60° C. for 3 days while exposed to moisture in the air. The 0.5 mm. film which was obtained had a tensile strength of 3500 lbs./sq. inch and an elongation of 80%.

Example 16

Using 25 grams of Pluracol TP4040, 25 grams of Pluracol P2020 and 4.5 grams tolylene diisocyanate, a solution was obtained which remained unchanged in a closed container for over one week. A film was cast as previously done, which film only set after 5 days. After 7 days exposure to air, the film had a tensile strength of 800 lbs./sq. inch and an elongation of 20%. It was much softer and rubbery than the product containing the polymer compound of Example 12.

Examples 17–31

The following polymer solutions are usable in connection with the instant invention. In each case the film-forming polymer contains radicals reactive with the cyanato radicals. The polymerization catalyst used in these reactions was 0.25% azobisisobutyronitrile calculated on the monomers.

After the polymerization was completed and the flask cooled, a viscous solution was formed which could be further diluted with the LG 56. The solution had a hydroxyl equivalent of 24.5 mg. KOH/gm. and a free vinyl acetate content or 0.1%. No free acrylic ester could be detected. The polymer content of the solution was 47.5%. The viscosity of the solution after dilution with an equal amount of LG 56 was 4000 cps.

A sample of the solution was treated with petroleum ether which precipitated the polymer from the polyol solution. The precipitate was separated by filtration and then extracted in a Soxhlet extractor using additional petroleum ether. The polymer was then dissolved from the filter paper with acetone and after evaporating the acetone was weighed. The precipitated polymer so obtained constituted 51.3% of the weight of the polymer solution. Based on the monomer content of the solution of 47.5%, this indicated that 7.8% of the polymer was due to the molecules of the polyol attached to the polymer chains. The calculated equivalent weight of the polymer was then about 14,00. The reduced viscosity calculated from measurement in a 2.5% solution was 0.28.

To determine the reactivity of the solution with an isocyanate, the following ingredients were reacted:

|  | Gm. |
|---|---|
| Polymer solution (no dilution) | 100 |
| Silicone oil emulsifier | 2 |
| Tetramethyl butane diamine | 0.1 |
| Water | 3.5 |
| Tolylene diisocyanate | 40.7 |

| Example No. | Monomers | Quantity (grams) | Solvent | Quantity (grams) |
|---|---|---|---|---|
| 17 | Vinyl acetate | 300 | Pluracol P2010 | 900 |
|  | 2-ethylhexyl acrylate | 60 |  |  |
|  | Acrylic acid | 60 |  |  |
| 18 | Itaconic acid (H₂SO₄, 0.2 gram) | 100 | Pluracol P1010 (a polypropylene glycol of 1,000 molecular weight and 500 combining weight). | 200 |
| 19 | Styrene | 130 | Pluracol P410 (a polypropylene glycol of 400 molecular weight and 200 combining weight). | 230 |
|  | Itaconic acid | 52 |  |  |
| 20 | Styrene | 220 | Pluracol P2010 | 500 |
|  | 2-ethylhexyl acrylate | 124 |  |  |
|  | Itaconic acid | 62 |  |  |
| 21 | Styrene | 100 | ....do.... | 210 |
|  | Di-n-butyl itaconate | 52 |  |  |
|  | Itaconic acid | 48 |  |  |
| 22 | Butyl acrylate | 220 | ....do.... | 300 |
|  | Acrylic acid | 72 |  |  |
| 23 | Butyl aminoethyl methacrylate | 124 | ....do.... | 400 |
| 24 | Methyl methacrylate | 300 | ....do.... | 500 |
|  | 2-ethylhexyl acrylate | 100 |  |  |
|  | Hydroxyethyl methacrylate | 64 |  |  |
| 25 | Styrene | 260 | Pluracol P410 | 500 |
|  | Methacrylic acid | 148 |  |  |
| 26 | Styrene | 260 | Pluracol P2010 | 500 |
|  | Acrylic acid | 148 |  |  |
| 27 | Styrene | 260 | Pluracol P1010 | 500 |
|  | Acrylic acid | 148 |  |  |
| 28 | Styrene | 260 | Pluracol P410 | 500 |
|  | Acrylic acid | 148 |  |  |
| 29 | Vinyl acetate | 450 | PPG 2025 (a polypropylene glycol with an OH equivalent of 56 mg. KOH/gm. and an average mol. wt. of 2,000). | 500 |
|  | 2-ethylhexyl acrylate | 25 |  |  |
|  | Hydroxypropyl methacrylate | 25 |  |  |
| 30 | Styrene | 110 | LG 56 (a polyoxypropylene triol with an OH equivalent of 55.5 mg. KOH/gm. and an average mol. wt. of 3,000). | 210 |
|  | 2-ethylhexyl acrylate | 62 |  |  |
|  | Hydroxypropyl methacrylate | 16 |  |  |
| 31 | Vinyl propionate | 570 | LG 56 | 610 |
|  | Hydroxypropyl methacrylate | 30 |  |  |

Example 32

In this example, as in Examples 1–3, the film-forming polymer was made from monomers which did not have an active hydrogen in the ethylenically unsaturated monomers themselves. The polymerization was carried out under the conditions and procedures of Example 1, the charge of the flask being:

|  | Gm. |
|---|---|
| Vinyl acetate | 700 |
| 2-ethylhexyl acrylate | 27 |
| LG 56 | 800 |
| Azobisisobutyronitrile | 0.75 |

A cellular product was obtained as before. After aging for 48 hours at room temperature, the cellular product was shredded and then extracted with acetone in a Soxhlet extractor. The acetone extract was 3.9% by weight of the weight of the original cellular product, indicating that the polymer contained active hydrogen radicals which had chemically reacted with the isocyanate. When the same monomers were polymerized in a volatile solvent, then dispersed in the LG 56 and the resulting polymer solution in the LG 56 made up into a cellular product using the same formula as above and extracted with acetone, it was found that 90% of the polymer in the cellular product was removed by the acetone extraction.

A cellular product was made as in Example 2 using the following ingredients:

| | Gm. |
|---|---|
| Polymer solution | 50 |
| LG 56 | 50 |
| Silicone oil emulsifier | 2 |
| Tetramethyl butane diamine | 0.1 |
| Tin octoate | 0.36 |
| Water | 3.5 |
| Tolylene diisocyanate | 41.8 |

All of the ingredients, except the diisocyanate were first mixed and then the diisocyanate mixed in over a period of about 30 seconds. In about 10 minutes the product had set to a solid mass. After aging for 3 days at room temperature it was tested, using as the control a product prepared using the same formula, but containing 100 gm. of the pure LG 56 and with 44.5 gm. of the diisocyanate (the larger amount of the diisocyanate was needed to compensate for the higher hydroxyl equivalent of the pure LG 56). The results are tabulated as follows:

| | Example 32 | Control |
|---|---|---|
| Density (lbs./c. ft.) | 1.90 | 1.82 |
| Indentation load (lbs./sq. ft.): | | |
| Compression 25% | 1.2 | 0.76 |
| Compression 65% | 2.5 | 1.4 |
| Compression 90% | 18.8 | 8.5 |
| Compression set (90% compression), percent | 8.7 | 9.2 |
| Acetone Solubility, percent | 4.8 | 2.8 |

These results indicate that the film-forming polymer contained reactive hydrogen radicals by reason of the chemical attachment of the polyol molecules with the result that the film-forming polymer was combined chemically with the polyisocyanate, thereby giving a polyurethane product of improved properties.

Examples 33–36

Following the same procedure as in Example 32, the following polymer solutions were prepared which were useful for the same purpose as those set forth above:

| | Ex. Nos. | | | |
|---|---|---|---|---|
| | 33 | 34 | 35 | 36 |
| Ingredients Parts by Weight: | | | | |
| Vinyl acetate | 162 | 171 | 173 | 175 |
| 2-ethylhexyl acrylate | 18 | 9 | 7 | 4.5 |
| Pluracol P2010 | 200 | 200 | 200 | 200 |

In some instances, if the polymerization process is modified so that the monomers are added to a polyol in a single batch and then polymerization initiated, the resulting polymer precipitates from the polyol when formed. However, by adding the monomers incrementally, a stable, uniform dispersion is produced. In contrast of this, in the polymerization of other monomers, such as vinyl acetate and 2-ethylhexyl acrylate, the reverse is true. Thus, in this latter monomer system, incremental addition of the monomers as polymerization proceeds results in a copolymer which separates from the polyol on cooling, while adding the monomers in a single batch to the polyol and then carrying out the polymerization results in a uniform solution of the copolymer in the polyol.

Examples 37–41

The following polymer solutions are usable in connection with the instant invention. The polymerization catalyst used in these reactions was 0.25% azobisisobutyronitrile calculated on the monomers.

| Example | Monomer | Quantity, parts | Solvent | Quantity, parts |
|---|---|---|---|---|
| 37 | Styrene | 53 | PPG 2025 | 156 |
| | 2-ethylhexyl acrylate | 30 | | |
| | Acrylamide | 17 | | |
| 38 | Styrene | 52 | PPG 425* | 92 |
| | 2-ethylhexyl acrylate | 20 | | |
| | t-Butylamino methacrylate | 19 | | |
| 39 | Vinyl propionate | 100 | PPG 2025 | 127 |
| 40 | Vinyl butyrate | 100 | PPG 2025 | 100 |
| 41 | Butyl acrylate | 75 | PPG 2025 | 100 |
| | Acrylic acid | 25 | | |

*A polypropylene glycol having a hydroxyl number of 265 and a molecular weight of about 400.

In the above solutions the vinyl butyrate solution had a significantly higher viscosity than the vinyl propionate solution. The solution of Example 38 is also noteworthy in that the solution produced by the polymerization gelled somewhat; however, it was easily dilutable with further additions of the polyol.

Examples 42–45

Reactive solutions were prepared as described in Examples 37 through 41, using in Example 42 a monomer mixture of 96 parts vinyl acetate to 4 parts 2-ethylhexyl acrylate; in Example 43 vinyl propionate; in Example 44 vinyl butyrate and in Example 45 vinyl 2-ethylhexoate. In each case the polyol used as the solvent for the polymerization was LG 56. A cellular polyurethane foam was then prepared from these reactive solutions using the procedures shown in Example 32. The resulting foams were then cut up into small pieces and extracted to constant weight in a Soxhlet extractor using acetone. A polyurethane was prepared from LG 56 without any polymer present and subjected to the same extraction to serve as a control. The results are set forth in the following table:

| Example | Total Polymer Content of Polyurethane (weight percent) | Amount extracted (weight percent of sample) | Chemically bound polymer (percent) | Chemically bound polymer (corrected percent) |
|---|---|---|---|---|
| 42 | 32.5 | 3.9 | 87 | 95 |
| | 24.3 | 2.7 | 88.5 | 99.9 |
| 43 | 33.2 | 10.3 | 68.6 | 77 |
| 44 | 25 | 4.7 | 81.5 | 91 |
| 45 | 25 | 3.4 | 86 | 96 |
| Control | 25 | 3 | 88 | 98 |
| | | 2.4 | | |

Each of the polymers in these examples was prepared from monomers which do not contain an active hydrogen group which would be reactive with the isocyanato group. Thus these examples clearly show that some of the polyol has been chemically attached to the polymer with the result that a significant reaction occurs between the isocyanato group and the film-forming polymer in the polyol.

When the same procedure as in Example 32 is used to separate the polymer from the polyol, again an increase in weight of the recovered polymer was found indicating that some of the molecules of the polyol were attached to the polymer. Thus the polymers and copolymers produced by the solution polymerization of ethylenically unsaturated monomers in a polyol solution have significantly altered properties from those that would be obtained if the polymerization were carried out in a completely inert solvent. At the same time the degree of reactivity is such that the polymerization of the monomers is not interfered with and proceeds to completion without gelling or other adverse effect.

Example 46

An ester was prepared by heating azelaic acid and ethylene glycol in a ratio of 1 mol of acid to 2 mols of glycol and removing the water of condensation to yield a polyester having an acid number of 44 and a hydroxyl number of 244. Utilizing the polyester so formed as the solvent for preparing the reactive solution of the invention, 100 gm. of vinyl butyrate were added to 210 gm. of the polyester. The solution was heated under a nitrogen blanket to about 80° C. at which point it started to show substantial reflux. The catalyst was then added, in this case 0.5 gm. of azobisobutyronitrile. Upon completion of the polymerization there was obtained a clear solution having 0.46% unreacted monomer and possessing a hydroxyl equivalent of 172 which could be used in preparing a rigid cellular polyurethane product.

Example 47

A polyester was prepared as in Example 46 using 2 mols of azelaic acid and 3 mols of ethylene glycol. The resulting polyester had a relatively high viscosity, an acid number of 11 and a hydroxyl number of 48. To 200 gm. of the polyester there were added 150 gm. of vinyl butyrate and the monomer was polymerized as in Example 49, excepting that a higher concentration of catalyst was employed, in this case 1.5 gm. of the azobisisobutyronitrile. Again a clear viscous solution was obtained which was suitable for making a cellular polyurethane product.

Example 48

In a stainless steel autoclave equipped with a stirrer and temperature control means, a reactive composition of polyisoprene in LG 56 triol was produced using 1600 parts of LG 56 triol, 20 parts of dibenzoyl peroxide in 118 parts of acetone and 400 parts of isoprene. The reaction period was about 27 hours, at about 80° C. to 90° C. After vacuum distillation, the reactive composition was gray-white in color, had a viscosity of 1,000 cps. at 25° C., an average hydroxyl number of about 44.8 and a 20% polyisoprene content.

Foams were produced from this reactive composition using the following recipes:

| Run | A | B | C |
| --- | --- | --- | --- |
| Reactive Composition | 100 | 75 | 25 |
| Polyol (LG 56) | 0 | 25 | 75 |
| Emulsifier (A polysiloxane-polyoxyalkylene block copolymer having a total average molecular weight of about 7,000) | 2 | 2 | 2 |
| Water | 3.5 | 3.5 | 3.5 |
| TMBDA (N,N,N',N'-tetramethyl-1,3-butanediamine) | 0.1 | 0.1 | 0.1 |
| Stannous octoate | 0.3 | 0.3 | 0.3 |
| Tolylene diisocyanate | 42.7 | 43.2 | 44.2 |
| Their characteristics were— | | | |
| Rise time (sec.) | 150 | 138 | 102 |
| Tensile (p.s.i.) | 14.6 | 14.9 | 14.9 |
| Elongation (percent) | 145 | 160 | 140 |
| Density (lbs./ft.³) | 1.78 | 1.78 | 1.68 |
| Indentation load deflection (p.s.i.): | | | |
| 25% | 0.85 | 0.69 | 0.75 |
| 65% | 1.7 | 1.5 | 1.6 |
| 90% | 9.7 | 8.2 | 8.0 |
| Yield point: | | | |
| Deflection (percent) | 4.2 | 5.2 | 4.2 |
| Load (p.s.i.) | 0.73 | 0.57 | 0.63 |

Example 49

In a manner similar to that described in Example 48, a reactive composition of polyisoprene in LG 56 triol was produced using 1800 parts of LG 56 triol, 20 parts of dibenzoyl peroxide and 200 parts of isoprene. The reaction period was about 20 hours at about 85° C. to 90° C. After vacuum distillation the polyisoprene/polyol was slightly hazy, had a viscosity of 760 cps. at 25° C., an average hydroxyl number of about 46.3 and a 10 percent polyisoprene content.

Foams were produced from this reactive composition using the following recipes:

| Run | A | B | C |
| --- | --- | --- | --- |
| Reactive Composition | 100 | 75 | 25 |
| Polyol (LG 56) | 0 | 25 | 75 |
| Emulsifier | 2 | 2 | 2 |
| Water | 3.5 | 3.5 | 3.5 |
| TMBDA | 0.1 | 0.1 | 0.1 |
| Stannous octoate | 0.3 | 0.3 | 0.3 |
| Tolylene diisocyanate | 43.0 | 43.4 | 44.2 |
| Their characteristics were: | | | |
| Rise time (sec.) | 138 | 137 | 100 |
| Tensile (p.s.i.) | 21.4 | 13.6 | 15.5 |
| Elongation (percent) | 130 | 124 | 138 |
| Density (lbs./ft.³) | 1.80 | 1.63 | 1.60 |
| Indentation load deflection (p.s.i.): | | | |
| 25% | 0.84 | 0.72 | 0.74 |
| 65% | 1.7 | 1.4 | 1.5 |
| 90% | 9.4 | 7.0 | 7.3 |
| Yield point: | | | |
| Deflection (percent) | 4.7 | 4.3 | 4.1 |
| Load (p.s.i.) | 0.71 | 0.59 | 0.62 |

Example 50

In a manner similar to that described in Example 48, a reactive composition of poly(butadiene/styrene) in LG 56 triol was produced using 1800 parts of LG 56 triol, 150 parts of butadiene, 50 parts of styrene, and 20 parts of dibenzoyl peroxide in 222 parts of benzene. The reaction period was about 10.5 hours at about 87° C. After vacuum distillation the copolymer/polyol composition was hazy and dull white in color and had an average hydroxyl number of about 61.5.

Foams were produced from this reactive composition using the following recipes:

| Run | A | B | C |
| --- | --- | --- | --- |
| Reactive composition | 100 | 50 | 25 |
| Polyol (LG 56) | 0 | 50 | 75 |
| Emulsifier | 2 | 2 | 2 |
| Water | 3.5 | 3.5 | 3.5 |
| TMBDA | 0.1 | 0.1 | 0.1 |
| Stannous octoate | 0.3 | 0.3 | 0.3 |
| Tolylene diisocyanate | 45.5 | 45.1 | 44.9 |
| Their characteristics were— | | | |
| Rise time (sec.) | 143 | 105 | 92 |
| Tensile (p.s.i.) | 21.4 | 19.1 | 18.9 |
| Elongation (percent) | 193 | 209 | 204 |
| Density (lbs./ft.³) | 1.85 | 1.67 | 1.69 |
| Indentation load deflection (p.s.i.): | | | |
| 25% | 0.73 | 0.69 | 0.63 |
| 65% | 1.5 | 1.3 | 1.2 |
| 90% | 8.8 | 6.1 | 6.4 |
| Yield point: | | | |
| Deflection (percent) | 3.6 | 4.5 | 3.9 |
| Load (p.s.i.) | 0.60 | 0.60 | 0.57 |

Example 51

In a manner similar to that described in Example 48, a reactive composition of poly(butadiene/styrene) in LG 56 triol was produced using 1800 parts of LG 56 triol, 150 parts of butadiene, 50 parts of styrene, and 20 parts of dibenzoyl peroxide. The reaction period was about 10 hours at 80° C. to about 89° C. After vacuum distillation the copolymer/polyol composition was hazy white, had an average hydroxyl number of about 48.1, 2.5% polymerized styrene, and 7.5% polymerized butadiene.

Foams were produced from this reactive composition using the following recipes:

| Run | A | B | C |
| --- | --- | --- | --- |
| Reactive composition | 100 | 75 | 25 |
| Polyol (LG 56) | 0 | 25 | 75 |
| Emulsifier | 2 | 2 | 2 |
| Water | 3.5 | 3.5 | 3.5 |
| TMBDA | 0.1 | 0.1 | 0.1 |
| Stannous octoate | 0.3 | 0.3 | 0.3 |
| Tolylene diisocyanate | 43.3 | 43.7 | 44.3 |
| Their characteristics were— | | | |
| Rise time (sec.) | 120 | 115 | 83 |
| Tensile (p.s.i.) | 15.2 | 19.6 | 14.6 |
| Elongation (percent) | 171 | 185 | 178 |
| Density (lbs./ft.³) | 1.68 | 1.50 | 1.67 |
| Indentation load deflection (p.s.i.): | | | |
| 25% | 0.85 | 0.80 | 0.78 |
| 65% | 1.6 | 1.5 | 1.5 |
| 90% | 8.3 | 7.0 | 8.3 |
| Yield point: | | | |
| Deflection (percent) | 50 | 38 | 11 |
| Load (p.s.i.) | 0.85 | 0.78 | 0.68 |

As was noted previously, polymeric amino compounds, particularly tertiary amines, will serve as catalysts for the polyurethane formation and no further catalyst components are necessary. This may be illustrated by the following example.

Example 52

In the manner described previously, 150 grams of dimethylaminoethylacrylate, 100 grams of a trifunctional polyol, and 1 gram of azobisisobutyronitrile catalyst were mixed in a three-neck flask as described previously. The trifunctional polyol had been prepared by the addition of propylene oxide to glycerol and had an average molecular weight of 3,000 and an OH equivalence of 56 mg. KOH per gm. The dimethylaminoethylacrylate was freed from inhibitor by passing it through columns packed with charcoal and absorbant silica gel. The flask contents were heated under a nitrogen blanket and agitated for 9 hours at 80° C. A clear yellowish liquid resulted which had an unrecated monomer content of 2½% and a viscosity of 1100 cps. at 25° C. This reactive composition formed a stable emulsion when mixed with water and could be diluted without difficulty with other polyols and with components necessary for urethane formation. To produce a cellular plastic 20 gm. of the reactive composition were mixed with 80 gm. of the same polyol used in the preparation of the reactive composition, 2 parts of a silicone surface-active agent, and 0.5 gm. of tin octoate and 2.9 gm. of water. To this mixture were added 37 gm. of tolylene diisocyanate. The resulting cellular foam had a foam rise time of 40 seconds and solidified within 80 seconds after mixing with the isocyanate. Surface tacking disappeared after 2 minutes; after 30 minutes the foam had set to a coherent strong plastic with negligible shrinkage. When heated for 30 minutes at 80° C. a strong elastic product was obtained which had excellent properties and no amine odor.

When the polymer formed in the polyol or other reactive solvent is a nitrogen derivative which has catalytic activity in the polyurethane reaction as exemplified above and as described previously, the requirement that the polymer be a film-former may be relaxed since the main function of the polymer is that of a catalyst. This last example clearly demonstrates that tertiary amines can be replaced by catalytically active polymers which are nitrogen derivatives to produce good polyurethane products. Since the nitrogen-containing polymer is of low volatility as compared to the usual amine catalysts, the urethane products have substantially no odor.

In addition to the various previously mentioned advantages of the instant process and improved products, still additional advantages result from the practice of the present invention. For example, the use of a reactive solvent rather than a mere diluent makes unnecessary its removal from the finished product and avoids the shrinkage which invariably attends such removal.

A further advantage lies in the use of the solutions of the present invention to increase the viscosity of the composite mixture used for the production of the polyurethanes, which improves the flow properties of the liquids for most of the applications. When making cellular expanded type products, the high viscosity of the mixture will prevent premature escape of gases from the foam cells and a fine-textured product can be produced. Such premature escape of gases frequently causes difficulties in a "one-shot" process. As a result, the prior art limitation to the use of polyesters, polyethers and other prepolymers of high viscosity for the polyurethane reaction is removed. The film-forming polymers act as "bodying" agents in the reactive solutions so that the so-called "one-shot" process can be used more effectively.

Still another advantage of the process of the present invention is the improvement in the load-bearing characteristics of foam products as well as the tensile strength and stability of the foam cells. When nonporous films are made, their hardness, flexibility, abrasion resistance, tensile strength, elongation, rebound and, in general, all of their physical properties can be favorably altered by using the process of the present invention. Thus, film-forming polymers may be easily combined chemically into the polyurethane to produce a new class of polymers having properties more valuable than either material alone. Plasticizers for the polymer compounds can be used. Other modifiers can be used such as polymers having reactive radicals, but not reactive with the NCO radical. In this latter case, the remaining reactive sites, such as double bond and unreacted carboxyls, can be used as additional cross-linking sites.

Where it is desired to increase the number of reactive groups on the polymer chain formed in the reactive solvent, and where it is desired to introduce a species of reactive group into the polymer so formed which is different from the reactive groups present on the polymer and in the reactive solvent, monomers with the desired reactive groups can be further grafted to the polymer backbone; thus a reactive composition can be produced containing a polymer having a number of different species of reactive groups even though the reactive solvent and the polymer formed in the reactive solvent were initially free from such groups. Thus the reactive groups may be altered and/or new groups may be introduced into the polymer, for example, by hydrolyzing the polymer (as hydrolyzing polyvinyl acetate to introduce hydroxyls), by grafting (as in grafting acrylic acid, et cetera, on a polymerized diene, as described in U.S. 2,859,201), by oxidation (as shown, for example, in U.S. 2,762,790), et cetera. See also U.S. 2,837,496.

The extreme versatile nature of the process of the instant invention makes possible the production of products having a wide variety of characteristics, and can effectively be used for forming not only cellular polyurethane products, but films, coatings, cast or molded articles, et cetera. As is well known, cellular polyurethane products may be obtained by inducing the polyurethane reaction in the presence of a gas-producing agent or "blowing agent" such as water, fluorohydrocarbons, et cetera.

The term "polyurethane," when used in the specification and claims, is to be broadly construed to embrace the polymeric reaction product of isocyanates with compounds containing radicals reactive with the —N=C=O radicals of said isocyanates.

What is claimed is:

1. A method for preparing reactive compositions comprising the steps of
   (a) dispersing a minor amount of ethylenically unsaturated monomer in a major amount of a solvent medium, said solvent medium consisting essentially of at least one normally liquid polyol essentially free from ethylenic unsaturation and having a molecular weight of at least about 500 and a hydroxyl number in the range of about 30 to about 600, and (b) polymerizing said monomer in said solvent by free radical addition polymerization to a substantially linear polymer having a molecular weight of at least 5,000 to provide a liquid, stable dispersion of polymerpolyol having a viscosity of less than 40,000 cps. at 10% polymer concentration.

2. A method in accordance with claim 1 wherein said ethylenically unsaturated monomer is free of reactive radicals containing active hydrogen atoms.

3. A method in accordance with claim 1 wherein said monomer and said polyol are selected to provide a polymer in said polymer-polyol mixture containing radicals selected from the group consisting of —COOH, —OH, —SH and organic nitrogen-containing radicals in which all of the nitrogen bonds are satisfied by bonds with at least one member selected from the group consisting of carbon and hydrogen.

4. A method in accordance with claim 1 wherein said monomer is a single species of ethylenically unsaturated monomer.

5. A method in accordance with claim 1 wherein said reactive composition is produced by the in situ polymerization of a plurality of ethylenically unsaturated monomers in said solvent medium.

6. A method in accordance with claim 1 wherein said ethylenically unsaturated monomer contains an organic nitrogen-containing radical in which all of the nitrogen bonds are satisfied by bonds with at least one member selected from the group consisting of carbon and hydrogen.

7. A method as defined in claim 1 wherein said ethylenically unsaturated monomer is selected from the group consisting of acrylic acid, methacrylic acid, crotonic acid, itaconic acid, 2-hydroxyethyl methacrylate, hydroxyethyl acrylate, hydroxypropyl acrylate, hydroxypropyl methacrylate, t-butylaminoethyl methacrylate, dimethylaminoethyl methacrylate, glycidyl acrylate, diglycol esters of itaconic acid, glycol monoesters of itaconic acid, methyl monoester of itaconic acid, allyl alcohol, maleic acid, fumaric acid, acrylamide and substituted acrylamide.

8. A method as defined in claim 1 wherein said film-forming polymer is a copolymer resulting from the polymerization of at least two ethylenically unsaturated monomers at least one of which contains at least one radical reactive with the —N=C=O radical of an isocyanate.

9. A method as defined in claim 8 wherein said ethylenically unsaturated monomer which contains at least one radical reactive with the —N=C=O radical of an isocyanate is selected from the group consisting of acrylic acid, methacrylic acid, crotonic acid, itaconic acid, 2-hydroxyethyl methacrylate, hydroxyethyl acrylate, hydroxypropyl acrylate, hydroxypropyl methacrylate, t-butylaminoethyl methacrylate, dimethylaminoethyl methacrylate, glycidyl acrylate, diglycol esters of itaconic acid, glycol monoesters of itaconic acid, methyl monoester of itaconic acid, allyl alcohol, maleic acid, fumaric acid, acrylamide and substituted acrylamide.

10. A reactive composition comprising the product of the in situ polymerization of an ethylenically unsaturated monomer in a reactive solvent having a plurality of radicals reactive with isocyanato radicals produced in accordance with the method of claim 1.

11. A reactive composition as defined in claim 10 wherein said ethylenically unsaturated monomer is free of reactive radicals containing active hydrogen atoms.

12. A reactive composition as defined in claim 10 wherein the polymeric product contains radicals selected from the group consisting of —COOH, —OH, NH$_2$, =NH, —SH, and CONH$_2$.

13. A reactive composition as defined in claim 10 wherein said monomer is a single species of ethylenically unsaturated monomer.

14. A reactive composition in accordance with claim 10 produced by the in situ polymerization of a plurality of ethylenically unsaturated monomers in said solvent.

15. A reactive composition as defined in claim 10 wherein said monomer contains a radical reactive with isocyanato radicals.

16. A reactive composition in accordance with claim 10 produced by the in situ polymerization of styrene in said solvent.

17. A reactive composition in accordance with claim 10 produced by the in situ polymerization of styrene and acrylic ester in said solvent.

18. A reactive composition in accordance with claim 10 produced by the in situ polymerization of a lower alkyl methacrylate in said solvent.

19. A reactive composition in accordance with claim 10 produced by the in situ polymerization of a lower alkyl acrylate in said solvent.

20. A reactive composition in accordance with claim 10 produced by the in situ polymerization of a vinyl ester in said solvent.

21. A reactive composition in accordance with claim 10 produced by the in situ polymerization of a vinyl ester and an acrylic ester in said solvent.

22. A reactive composition in accordance with claim 10 produced by the in situ polymerization of a polymerizable tertiary amine in said solvent.

23. A composition in accordance with claim 10 comprising the in situ polymerizate of a polymerizable ethylenically unsaturated monomer in a polyether polyol.

References Cited

UNITED STATES PATENTS

| | | | |
|---|---|---|---|
| 2,798,053 | 7/1957 | Brown | 260—88.1 |
| 2,888,409 | 5/1959 | Bender et al. | 260—2.5 |
| 2,965,615 | 12/1960 | Tess | 260—77.5 |
| 3,055,871 | 9/1962 | Heffler et al. | 260—77.5 |

JOSEPH L. SCHOFER, *Primary Examiner.*

H. WONG, *Examiner.*